United States Patent
Schlieski et al.

(10) Patent No.: US 9,146,940 B2
(45) Date of Patent: Sep. 29, 2015

(54) SYSTEMS, METHODS AND APPARATUS FOR PROVIDING CONTENT BASED ON A COLLECTION OF IMAGES

(75) Inventors: Tondra J. Schlieski, Beaverton, OR (US); James P. Melican, Hillsboro, OR (US); Lucas B. Ainsworth, Portland, OR (US); Jotham Porzio, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 202 days.

(21) Appl. No.: 13/994,991

(22) PCT Filed: Dec. 28, 2011

(86) PCT No.: PCT/US2011/067624
§ 371 (c)(1),
(2), (4) Date: Jun. 17, 2013

(87) PCT Pub. No.: WO2013/100979
PCT Pub. Date: Jul. 4, 2013

(65) Prior Publication Data
US 2013/0315445 A1    Nov. 28, 2013

(51) Int. Cl.
| | | |
|---|---|---|
| *G06K 9/20* | (2006.01) | |
| *G06K 9/32* | (2006.01) | |
| *G06K 9/22* | (2006.01) | |
| *H04N 1/00* | (2006.01) | |
| *G06F 17/30* | (2006.01) | |
| *H04N 21/414* | (2011.01) | |
| *H04N 21/4722* | (2011.01) | |
| *H04N 21/81* | (2011.01) | |

(Continued)

(52) U.S. Cl.
CPC ...... *G06F 17/30247* (2013.01); *H04N 1/00127* (2013.01); *H04N 21/41407* (2013.01); *H04N 21/4223* (2013.01); *H04N 21/4722* (2013.01); *H04N 21/4784* (2013.01); *H04N 21/6582* (2013.01); *H04N 21/8153* (2013.01); *G06K 9/20* (2013.01); *G06K 9/325* (2013.01)

(58) Field of Classification Search
CPC ........... G06K 9/20; G06K 9/22; G06K 9/325; H04N 1/00127
See application file for complete search history.

(56) References Cited

U.S. PATENT DOCUMENTS

| | | | | |
|---|---|---|---|---|
| 7,751,805 | B2* | 7/2010 | Neven et al. | 455/414.3 |
| 8,189,964 | B2* | 5/2012 | Flynn et al. | 382/305 |

(Continued)

FOREIGN PATENT DOCUMENTS

| | | |
|---|---|---|
| EP | 2 028 588 A2 | 2/2009 |
| WO | 2007/021996 A2 | 2/2007 |

OTHER PUBLICATIONS

"Notification Concerning Transmittal of International Preliminary Report on Patentability Chapter 1 of the Patent Cooperation Treaty", Jul. 10, 2014, for International Application No. PCT/US2011/067624, 6pgs.

(Continued)

*Primary Examiner* — Utpal Shah
(74) *Attorney, Agent, or Firm* — Buckley, Maschoff & Talwalkar LLC

(57) ABSTRACT

Systems, methods, articles of manufacture and apparatus provide for an augmented media experience. In some embodiments, the recognition of an image (e.g., by a mobile device and/or a central server) results in providing at least one associated media file to a user (e.g., via a display device).

20 Claims, 7 Drawing Sheets

(51) Int. Cl.
*H04N 21/4223* (2011.01)
*H04N 21/4784* (2011.01)
*H04N 21/658* (2011.01)

(56) References Cited

U.S. PATENT DOCUMENTS

| | | | |
|---|---|---|---|
| 8,781,152 B2 * | 7/2014 | Momeyer et al. | 382/100 |
| 8,897,506 B2 * | 11/2014 | Myers et al. | 382/118 |
| 2005/0154755 A1 | 7/2005 | Malu et al. | |
| 2006/0240862 A1 | 10/2006 | Neven et al. | |
| 2009/0046320 A1 * | 2/2009 | Dariel | 358/1.15 |
| 2009/0080028 A1 | 3/2009 | Gallant | |
| 2011/0184964 A1 | 7/2011 | Li | |
| 2012/0315884 A1 * | 12/2012 | Forutanpour et al. | 455/414.2 |
| 2013/0035081 A1 * | 2/2013 | Sanger | 455/414.2 |

OTHER PUBLICATIONS

"PCT Notification of Transmittal of the International Search Report and the Written Opinion of the International Searching Authority, or the Declaration", dated Sep. 7, 2012, for International Application No. PCT/US2011/067624, 9pgs.

"Communication: Extended European Search Report" dated Jul. 6, 2015 issued by the European Patent Office for EP Patent Application No. 11878793.6—1905/2798839—PCT/US2011067624, 9 pages.

* cited by examiner

SYSTEMS, METHODS AND APPARATUS FOR PROVIDING CONTENT BASED ON A COLLECTION OF IMAGES

BACKGROUND OF THE INVENTION

Although digital photographs and other types of digital media are increasingly more available to people via various types of electronic display devices, such as those in personal computers, tablet computers and mobile phones, some people still prefer the familiar physicality and form factor of printed photographs or snapshots.

BRIEF DESCRIPTION OF THE DRAWINGS

An understanding of embodiments described in this disclosure and many of the attendant advantages thereof may be readily obtained by reference to the following detailed description when considered with the accompanying drawings, of which.

DETAILED DESCRIPTION OF EXAMPLE EMBODIMENTS

Figure 1:
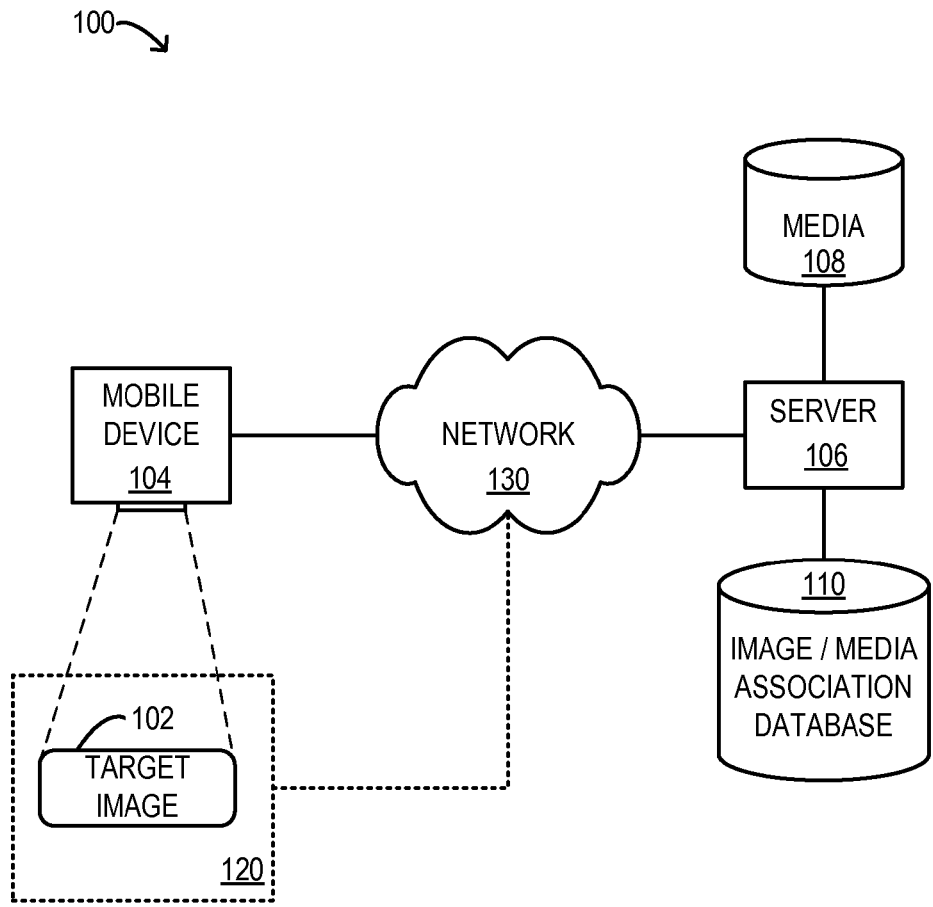
FIG. 1 is a block diagram of a system according to some embodiments.

Embodiments described in this disclosure are descriptive of systems, apparatus, methods, and articles of manufacture for providing and/or triggering an enhanced media experience. Some embodiments may comprise, for example, receiving (e.g., by a central controller device and/or from a user device) at least one digital image (e.g., a digital photograph taken using a digital camera device or other type of image capture device), receiving (e.g., by the central controller device and/or from a user device) digital media content (e.g., an audio file and/or a video file) related to the at least one digital image (e.g., a video of a location or event related to a digital photograph of the location or event), storing (e.g., by the central controller device) an indication of the digital image in association with an indication of the related digital media content, and transmitting (e.g., to an electronic display device and/or from the central controller device) the digital image.

Some embodiments may comprise, for example, receiving (e.g., by a central controller device and/or from a user device or image capture device) a digital image (e.g., a digital image photographed, scanned, recorded and/or otherwise captured via an image capture device), determining (e.g., by the central controller device based on the received digital image) digital media content associated with the received digital image, and providing (e.g., by the central controller device and/or to a user device) the digital media content (e.g., for output to a user via an output device of a user device).

Some embodiments may comprise, for example, receiving a first digital image, determining (e.g., by the central controller device based on the received first digital image) at least one second digital image (e.g., a closest image matching the received first digital image and/or a plurality or collection of images displayed in the first digital image), determining digital media content associated with the at least one second digital image, and providing the digital media content to a user device.

Applicants have determined that it may be beneficial, in accordance with some embodiments described in this disclosure, to provide for recognition of at least one image that does not include a logo, glyph, encoded mark or other indicator.

Applicants have also determined that it may be beneficial, in accordance with some embodiments described in this disclosure, to provide for recognition of at least one image, in which the image is not part of a predefined set of one or more images for comparing with the received image.

In accordance with some embodiments, systems, methods, articles of manufacture and apparatus are provided for maintaining a physical snapshot using a low power display device (e.g., an e-ink display device).

In accordance with some embodiments, systems, methods, articles of manufacture and apparatus are provided for reading, receiving and/or capturing an image (e.g., via a networked camera device, smartphone and/or camera phone), transmitting the image and/or an indication of the image to a content server and receiving, from the content server, content that is associated with the image (e.g., a video).

In accordance with some embodiments, systems, methods, articles of manufacture and apparatus are provided for providing content to a user device in response to receiving an indication that a plurality of images have been assembled or collected. In some embodiments, content is provided in response to receiving an indication or otherwise determining that a plurality of images have been arranged in a predetermined arrangement.

In accordance with some embodiments, systems, methods, articles of manufacture and apparatus are provided for providing content to a user device in response to receiving an indication of an image created by a user based on a plurality of smaller images (e.g., by arranging the smaller images to form the larger image). In some embodiments, each of the plurality of images is a piece of a larger image, similar to the way in which pieces of a picture puzzle may be arranged to complete the puzzle and reveal a completed picture.

In accordance with some embodiments, systems, methods, articles of manufacture and apparatus are provided for providing one or more images to a display device, such as an e-ink display device or a phone having a display screen (e.g., a touchscreen display) and/or displaying images via the display device.

In some embodiments, an image capture device, such as a smartphone with an integrated camera, a flatbed scanner, a digital camera, a video camera, and the like, capable of scanning, recording, capturing, reading or otherwise receiving image information, may be used to capture an image. In some embodiments, the image may appear in print or other static media. In some embodiments, the image may be captured by the image capture device (e.g., a camera integrated in a smartphone) as the image is displayed via an electronic display device (e.g., a computer display, a smartphone display screen, an e-ink display device). In one example, a digital photograph may be received by an e-ink display device (e.g., via a Wi-Fi network) and displayed by the e-ink display device. A user may then use a camera of a smartphone to scan or take a picture of the image displayed on the e-ink display device.

Applicants have recognized that it may be advantageous, in accordance with some embodiments described in this disclosure, to provide for a physical, digital snapshot that may be associated with and/or supplemented with additional media content (e.g., audio/video content).

In one example, the physical, digital snapshot may be embodied in (e.g., displayed via) a display device, such as, without limitation, an e-ink display device, digital picture frame, tablet computer, computer display monitor, television or display screen of a mobile telephone.

Applicants also have recognized that it may be advantageous, in accordance with some embodiments described in this disclosure, to provide users with the ability to create meaningful relationships between images (e.g., digital or printed photographs) and other content available via a dynamic, media delivery service. In some embodiments, the associated content may comprise one or more visual messages (e.g., a picture, an advertising campaign). In some embodiments, the associated content may be created for and/or provided to a particular user, or targeted audience of users.

Referring first to FIG. 1, a block diagram of a system 100 according to some embodiments is shown. In some embodiments, the system 100 may comprise a target image 102 and a mobile device 104 comprising an image capture device for capturing digitally a representation of the target image 102. According to some embodiments, the target image 102 may be displayed via an image medium 120. For example, in a print embodiment, image medium 120 may comprise print media in or on which the target image 102 appears, such as an advertising flyer, printed document, printed photograph, magazine or newspaper page and/or billboard. In some embodiments, image medium 120 may comprise one or more electronic display devices. For example, image medium 120 may comprise one or more low-power display devices, such as an e-ink display device and/or one or more other types of display devices, such as computer display monitors, tablet computer displays, electrophoretic displays, and/or smartphone displays. In one embodiment, image medium 120 may comprise a flexible electrophoretic display, such as an Arizona State University Flexible Display Center 3.7"Bloodhound flexible electrophoretic display, configured for wireless communication with a network and capable of displaying a gray scale and/or color image. In one embodiment, image medium 120 may comprise a bistable epaper display, which are generally characterized by relatively long battery life, and the ability to display images that "stick" once electronically set. In one embodiment, image medium 120 may comprise a bistable epaper display (e.g., Zenithal Bistable Display by ZBD Displays Ltd.), comprising two glass or plastic substrates with electrodes on both internal surfaces, overcoated with a polymer layer to provide alignment to liquid crystal.

In some embodiments, the target image 102 may comprise a composite image created by the respective images displayed by a plurality of separate image media. For example, each of four separate display devices and/or printed images may display a respective image that, collectively, may comprise the target image 102 captured by the image capturing device (e.g., digital camera, scanner) of mobile device 104.

In some embodiments, a representation of the target image 102 captured by the mobile device 104 may be provided to a server 106. The mobile device 104 may, for example, communicate with the server 106 via network 130, such as the Internet and/or a cellular telephone or a Public Switched Telephone Network (PSTN).

According to some embodiments, the server 106 may comprise an electronic and/or computerized controller device such as a computer server communicatively coupled to interface with the mobile device 104, image medium 120, media server 108 and/or image/media association database 110 (directly and/or indirectly). The server 106 may, for example, comprise one or more PowerEdge™ M910 blade servers manufactured by Dell®, Inc. of Round Rock, Tex. which may include one or more Eight-Core Intel® Xeon® 7500 Series electronic processing devices. According to some embodiments, the server 106 may be located remotely from one or more of the media server 108 and/or image/media association database 110. The server 106 may also or alternatively comprise a plurality of electronic processing devices located at one or more various sites and/or locations.

The server 106 may, in some embodiments, receive from the mobile device 104 a representation of the target image 102 (e.g., captured by a user using a camera integrated in a smartphone), and, based on the received representation of the target image 102, query image/media association database 110 to determine whether any media files are associated with the target image 102. In some embodiments, image/media association database 110 may store records including identifiers that uniquely identify one or more media files (e.g., stored on and/or accessible via media server 108) associated with particular digital images. Media files may comprise, for example, one or more of: a video file, an audio file, an advertisement, a text message and an e-mail message. The media server 108 may, for example, provide requested digital images and/or media files associated with digital images to the server 106 and/or to the mobile device 104 (e.g., via the server 106 and/or via a direct or indirect connection (not shown) to network 130). In accordance with some embodiments, in response to receiving a digital photograph taken by a mobile device 104, the server 106 identifies an associated video file (e.g., stored on media server 108) and transmits the video to mobile device 104, where the user may view the video, enhancing the user's media experience.

In some embodiments, the server 106 may store and/or execute specially programmed instructions to operate in accordance with embodiments described in this disclosure. The server 106 may, for example, execute one or more programs that manage and/or control the mobile device 104, the media server 108, the image/media association database 110 and/or the image medium 120, based on information about and/or indications of various digital images and/or associated media content.

According to some embodiments, the server 106 may comprise a computerized processing device such as a Personal Computer (PC), laptop computer, computer server and/or other electronic device configured and/or coupled to manage and/or facilitate receiving, storing, transmitting, analyzing and/or associating various types of digital media, including digital images and videos. The server 106 may be utilized, for example, to (i) receive an indication of a digital image, (ii) receive an indication of at least one display device that the digital image is to be transmitted to and/or made accessible by, (iii) receive an indication of at least one media file associated with the digital image, (iv) store an indication of the association of the digital image with the at least one media file, and (v) transmit the digital image to or otherwise make the digital image accessible by at least one display device (e.g., image medium 120). In another example, the server 106 may be utilized, for example, to (i) receive an indication of a digital image (e.g., a representation of target image 102 captured by a mobile device 104), (ii) determine, based on the received indication of the digital image, at least one media file associated with the digital image (e.g., as indicated in image/media association database 110), and (iii) transmit or otherwise facilitate the providing of the at least one associated media file (e.g., from media server 108) to the mobile device 104 (and/or other type of user device).

According to one example implementation, a user (e.g., a content creator) snaps a picture and/or a video (e.g., using mobile device 204) and transmits or otherwise publishes the picture image (via a service controlled by a central controller device) to a display device having a low power display screen and in communication with the central controller device. Such an example display device may be referred to in this disclosure as a "Pixit display," and the associated service may be referred to in this disclosure as a "Pixit service." Although some examples are described in this disclosure with respect to the Pixit display and Pixit service, it will be readily understood that various types of display devices may be used, in accordance with disclosed embodiments, in place of and/or in addition to low power display devices such as the example Pixit display. In some embodiments, the Pixit service stores the video on a storage device remote from the user (e.g., on media server 108), and establishes associations among the image, the Pixit display, and the associated video. For example, the central controller device may store in a database (e.g., image/media association database 110) a record storing an indication of the image (e.g., a unique identifier that identifies the image) in association with an indication of the Pixit display (e.g., an identifier that identifies the Pixit display) and in association with an indication of the video (e.g., a unique identifier that identifies the video). The central controller device may further store a copy of the video (e.g., at media server 108). In some embodiments the association of the image, the display device and/or any associated media files may be performed by the device the user used to capture the image (e.g., mobile device 104, mobile device 204) and/or one or more other types of user devices.

In some embodiments, a low power display device may comprise e-ink technology and/or other types electronic displays that allow for displaying images with relatively low power consumption. In some embodiments, communication between the display device (e.g., image medium 120) may be enabled through short range Wi-Fi or other types of communications networks and/or protocols, as described in this disclosure. In some embodiments, power for the low power display device may be enabled through kinetic and/or solar collectors.

In some embodiments, a first user may initially have a display device (e.g., image medium 120) and may give the display device (e.g., a Pixit display) to another user. The display device may be updated with the captured image before or after the display device is provided to the other user.

According to some embodiments, as discussed in this disclosure, a user having access to an image (e.g., a target image 102 displayed via a Pixit display) may use an image capture device, such as a camera integrated with a smart tablet, smartphone, mobile device 104 or mobile device 204, to scan and analyze the image and/or the displaying device using an image recognition application (e.g., Goggles™ software by Google). In some embodiments, the image recognition application recognizes the particular display device (e.g., determines an identifier that uniquely identifies the device) and/or the image being displayed. In one embodiment, the application may be configured to initiate playback of any associated content (e.g., a video) on the display of the device the user used to capture the image. In some embodiments, an image recognition application may be configured to recognize and/or search for content including one or more types of embedded indicium, such as glyphs, and identify the display device, the image and/or associated content based on the identified indicia (e.g., in accordance with the parameters of a central service).

According to some embodiments, a Pixit display or other display device may be used to display a particular image (e.g., a snapshot or fixed picture), until a user (e.g., a content creator) associates a new image (and perhaps one or more associated media files) with the Pixit display. The new image, for example, may be sent to all associated one or more Pixit displays. In one embodiment, the image may be updated on a particular Pixit display when the Pixit display is in range of an authorized Wi-Fi network. In some embodiments, a user may interact with a display device storing more than one image in order to determine which of the plurality of images is displayed via the display device. In some embodiments, a user (e.g., an image creator and/or user in possession of a display device) may delete old images from a display device and/or associated new content to any images available via the display device.

According to some embodiments, users may register display devices (e.g., Pixit devices) with a central service, allowing one or more authorized users to send images or other messages to the registered display devices.

According to some embodiments, a plurality of different content providers may be available to facilitate providing the additional, associated media content. In some embodiments, users may register images that embedded with a respective identifier (e.g., a watermark) that identifies the service provider that will provide the associated media content, and may be relied on by the image recognition application of a user who has received the image (e.g., via a registered display device) to contact the correct service via his mobile phone and receive the associated video.

According to one embodiment, a first user takes a holiday picture (e.g., using a digital camera), and also creates a family video message. She loads the picture and the video onto the exemplary Pixit service, which stores the picture, the associated video, and indication of their association. She also loads the image on twenty-five Pixit displays, and sends the Pixit displays to her friends and family as holiday cards. According to this example scenario, her friends and family receive the Pixit displays with the image displayed, and are able to enjoy them as they would a printed snapshot. Further, when one of the recipients scans the displayed image using an image recognition application and the camera on his smartphone, in accordance with one or more embodiments described in this disclosure, the Pixit service transmits the associated video to the smartphone (and/or other user device) and the user is also able to view the family video associated with the holiday picture. Continuing with the example scenario, if the first user creates and registers a new picture and a new holiday video message for the following year, she can have the new picture transmitted to the registered Pixit displays. Her friends and family are able to scan the new image and receive the new holiday message for that year using their smartphones.

In another example implementation, a user may upload a picture of his band and a music video of the bands new song to a central service, and may also load 1000 Pixit displays with the picture, for handing out to attendees the band's latest concert. Recipients of the displays are able to scan the picture with an image recognition program using their smartphones, and receive, via the central service, the music video and a promotional code for a discount on purchasing the album. Continuing with the example scenario, three months later, the band releases a new album, and updates all of the Pixit displays with a new image associated with a new video and a new offer. Accordingly, content creators using system 100 may use updated images (e.g., available to other users' display devices) to prompt users to use their mobile devices to receive additional, associated information (e.g., advertisements, promotions, videos, music, concert clips, interviews, etc.).

The system 100 may comprise, in some embodiments, one or more user devices (not shown), such as a Personal Computer (PC), laptop computer, smartphone, computer server, mobile computing device (e.g., mobile device 104) and/or other electronic device configured and/or coupled to manage and/or facilitate association of one or more digital images with one or more related media files and/or facilitate providing of one or more images to an end user via an image medium 120, such as an electronic display device (e.g., a digital picture frame, an e-ink display device, a display monitor coupled to a PC). In one example, a user may use his PC to upload a digital image to server 106 and indicate (e.g., using a unique identifier) a particular display device (or devices) (e.g., image medium 120) at which the digital image is to be displayed.

In some embodiments, although depicted separately in FIG. 1, the server 106 may comprise media server 108 and/or image/media association database 110.

In some embodiments, the media server 108 may comprise any type or configuration of computerized processing device such as a PC, laptop computer, computer server, database system and/or other electronic device, devices, or any combination thereof. In some embodiments, the media server 108 may be owned and/or operated by a third party (i.e., an entity different than any entity owning and/or operating the server 106). The media server 108 may, for example, be owned and/or operated by a media content provider (e.g., a photo and/or video sharing website). In some embodiments, the media server 108 may comprise a plurality of devices (e.g., may comprise a plurality of media servers) and/or may be associated with a plurality of third-party entities.

According to some embodiments, the system 100 may allow a user to use an image capturing application (e.g., residing on and/or accessible via the user's mobile device 104) such as, without limitation, a smartphone or table computer application that utilizes the device's integrated camera, to capture images displayed by other devices and/or media, and the system 100 further may provide the user access to a media use and management system. The combination of physical assets (e.g., means and/or devices by which target images may be displayed) and digital assets (e.g., the associated media content) may advantageously create, in accordance with some embodiments, a media platform allowing for managed updates (e.g., of a low power display device in Wi-Fi range) and end-user driven exploration and engagement.

Fewer or more of the components and/or various configurations of the components depicted in FIG. 1 may be included in the system 100 without deviating from the scope of embodiments described in this disclosure. In some embodiments, the depicted components may be similar in configuration and/or functionality to similarly named and/or numbered components as described in this disclosure. In some embodiments, the system 100 (and/or portion thereof, such as the server 106) may be programmed to and/or may otherwise be configured to execute, conduct and/or facilitate the methods and/or portions or combinations thereof described in this disclosure.

Figure 2:
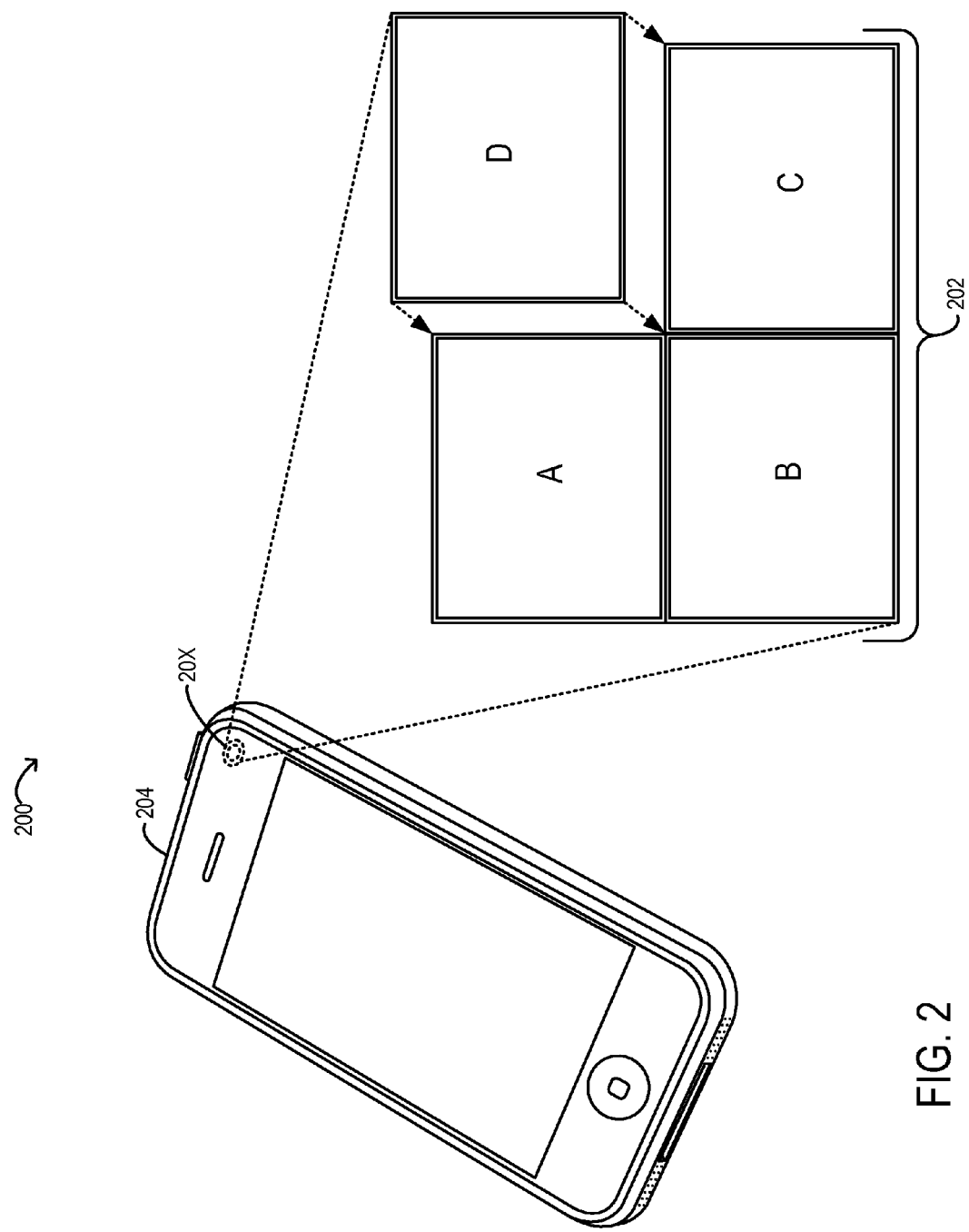
FIG. 2 is a diagram of an example system according to some embodiments.

Turning now to FIG. 2, a diagram of a system 200 according to some embodiments is shown. In some embodiments, the system 200 may facilitate the capturing of a digital image, such as for associating the digital image with other media content and/or for initiating the providing to a user of media content associated with the digital image. The system 200 may, for example, be similar in configuration and/or functionality to some components of the system 100 of FIG. 1, and may, in some embodiments, be used in various configurations with one or more other components of system 100.

According to some embodiments, the system 200 may comprise a mobile device 204 comprising a digital camera 208 (and/or other type of image capture device). In some embodiments, the system 200 comprises a set of one or more images 202. In the depicted example system 200, the set of images 202 includes a plurality of images A, B, C and D. It will be readily understood that the set of images 202 may comprise any number and/or configuration of images, and the set of images 202 may include one or more printed images, one or more digital images (e.g., displayed via an e-ink display device) and/or one or more images embodied and/or displayed via any type of media.

According to some embodiments, the digital camera 208 may capture an image (e.g., a composite image) of the set of images 202 (e.g., automatically, or in response to actuation by a user). For example, a user may place four display devices (e.g., low power display devices, e-ink display devices) together, each depicting one of the respective images A, B, C and D, and take a digital picture of all four images using a smartphone's digital camera.

In some embodiments, the mobile device 204 may be in communication (e.g., via a wireless telephone network) with a central controller device (e.g., server 106) to which the mobile device 204 may, in accordance with some embodiments described in this disclosure, transmit a digital picture of the set of images 202. In some embodiments, a user may upload the digital picture to a central controller device (e.g., controlling a picture and associated media content service) and may also indicate and/or transmit one or more other media files (e.g., a video) associated with the digital picture, to the central controller device.

In one example, a user may take a digital picture of a plurality of trading cards (e.g., physical cards and/or digital images of individuals), such as for a particular sport, sports figures and/or sports team. In one embodiment, first media content may be associated with and/or provided to a user in response to the user transmitting a composite image of all of the required player trading cards, irrespective of the arrangement of the cards. In another embodiment, second media content (e.g., different than the first media content) may be associated with and/or provided to the user in response to the user transmitting a composite image of all of the required cards arranged in a particular arrangement. In this way, the same set of images may be associated with one or more additional media files based on the physical arrangement of one or more of the images relative to one another. In some embodiments, a particular configuration of the images is not required, and a composite digital image may need to include only one or more particular images in order for the user to receive associated media content, as deemed appropriate for a particular implementation.

In one example implementation, a professional sports team may release images and/or display devices (e.g., Pixit displays) of each of the players on the team, much like player trading cards. For instance, Pixit displays may be sold and/or given away with qualifying purchases. When scanned by an image recognition application in communication with the central content service, each Pixit display may trigger its own video associated with the specific player. However, when a fan has collected all the images and/or devices associated with the team's players, and has assembled the "team photo" (e.g., as depicted by images A, B, C and D in set of images 202), the arrangement or collection of separate images becomes a new image recognizable by the system, triggering the playback of a different video (e.g., a team highlights video).

According to some embodiments, associated media files provided to a user in response to the user scanning a recognized image may be embedded with one or more unique codes (e.g., each fan who registers a team code might be eligible to win season tickets).

Figure 3:
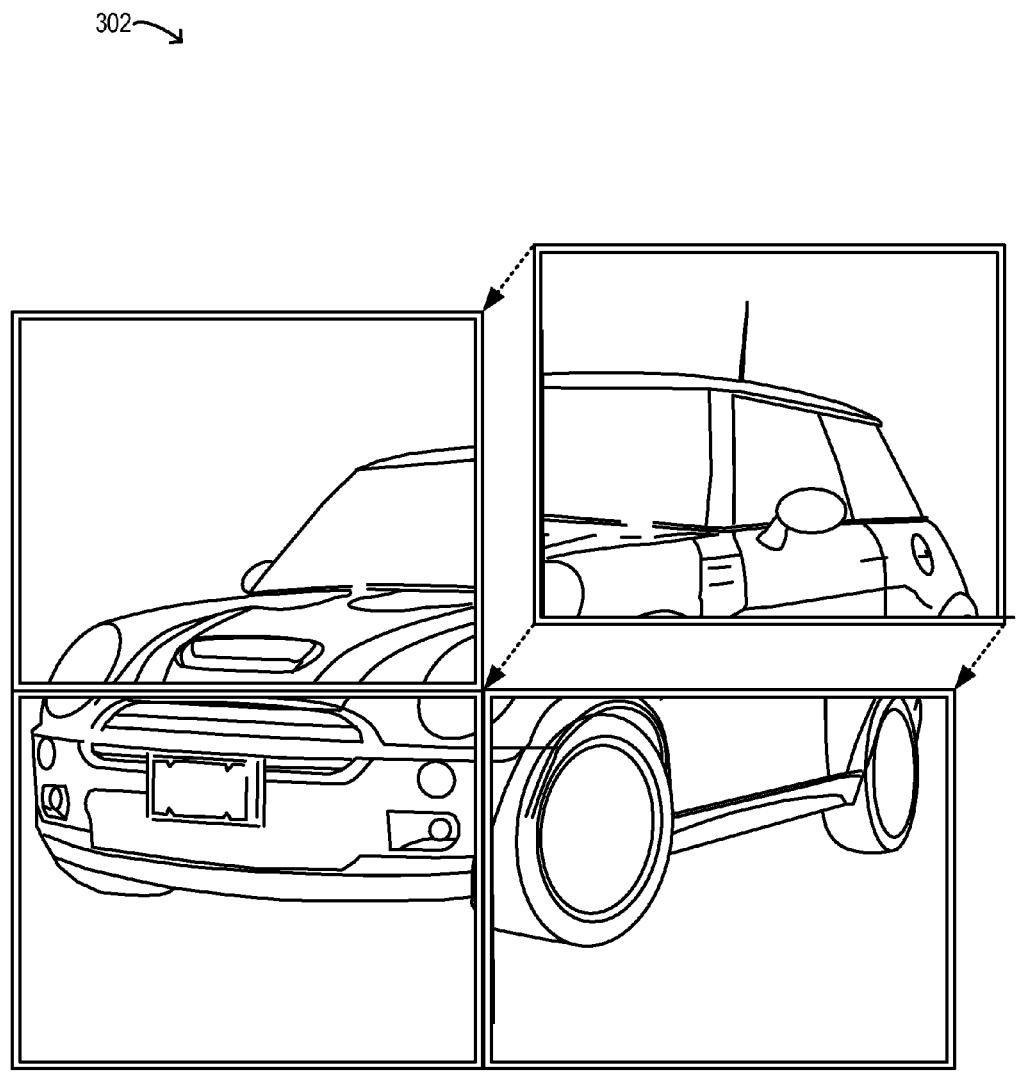
FIG. 3 is a diagram of an example collection of images according to some embodiments.

Referring to FIG. 3, a diagram of an example collection of images 302 according to some embodiments is shown. The example collection of images 302 depicts four separate images, each being a portion of a larger image of an automobile. In one example, as described in this disclosure with respect to some embodiments, each of the images that is a part of the larger image may be displayed via a separate, respective display device (e.g., an e-ink display device). In some embodiments, in order to receive additional media content related to a collection of images, a user may be required to arrange a plurality of images, take a composite digital image (e.g., using a smartphone's digital camera), and forward a copy of the composite digital image to a central controller device for providing additional content. In response, as described in this disclosure, the central controller device may transmit or otherwise arrange to have the additional associated media content provided to the user's smartphone and/or other device associated with the user. In some embodiments, the user may have to arrange a plurality of images in a particular, predetermined configuration. For example, as depicted in FIG. 3, a user may be required to assemble or complete a picture (e.g., completing a picture puzzle) using a plurality of partial images (e.g., puzzle pieces) that make up the larger picture.

According to some embodiments, multiple display devices (e.g., Pixit displays) may be registered (e.g., with a central controller device) in association with one another, such as by associating each of the respective display device identifiers with a common group identifier. In one example, a plurality of images and/or display devices may be grouped together, allowing for the display of multiple images among a group of associated display screens. For instance, a content creator can "break" a single image into multiple images and/or for display across multiple screens. In some embodiments, an end user must collect all the images and/or all the associated display devices (e.g., Pixit displays) together and "assemble" the complete image before the other, associated media content may be made available and/or triggered for transmission to the user's mobile phone or other user device.

In one embodiment, a content creator uploads a digital image to a central service (e.g., the example Pixit service) and indicates it is a puzzle. In one embodiment, the user may indicate a number of pieces among which the user would like the original image divided. The user and/or the central service then publishes the component images to multiple image media (e.g., multiple Pixit displays) which, in accordance with some embodiments, must be arranged in a particular way in order to compose the full, original image and trigger the associated media content. In one embodiment, one or more of the individual images that together make up a larger, completed image, may be associated with respective media content (e.g., a particular message or video), but, as discussed with respect to the set of images 302, the individual images may have to be arranged to create the overall, completed image before the image recognition software (e.g., of a mobile device 204, of a server 106) will translate the composite image and facilitate presentation of any media content associated with the completed image (e.g., a "puzzle" video).

Figure 4:
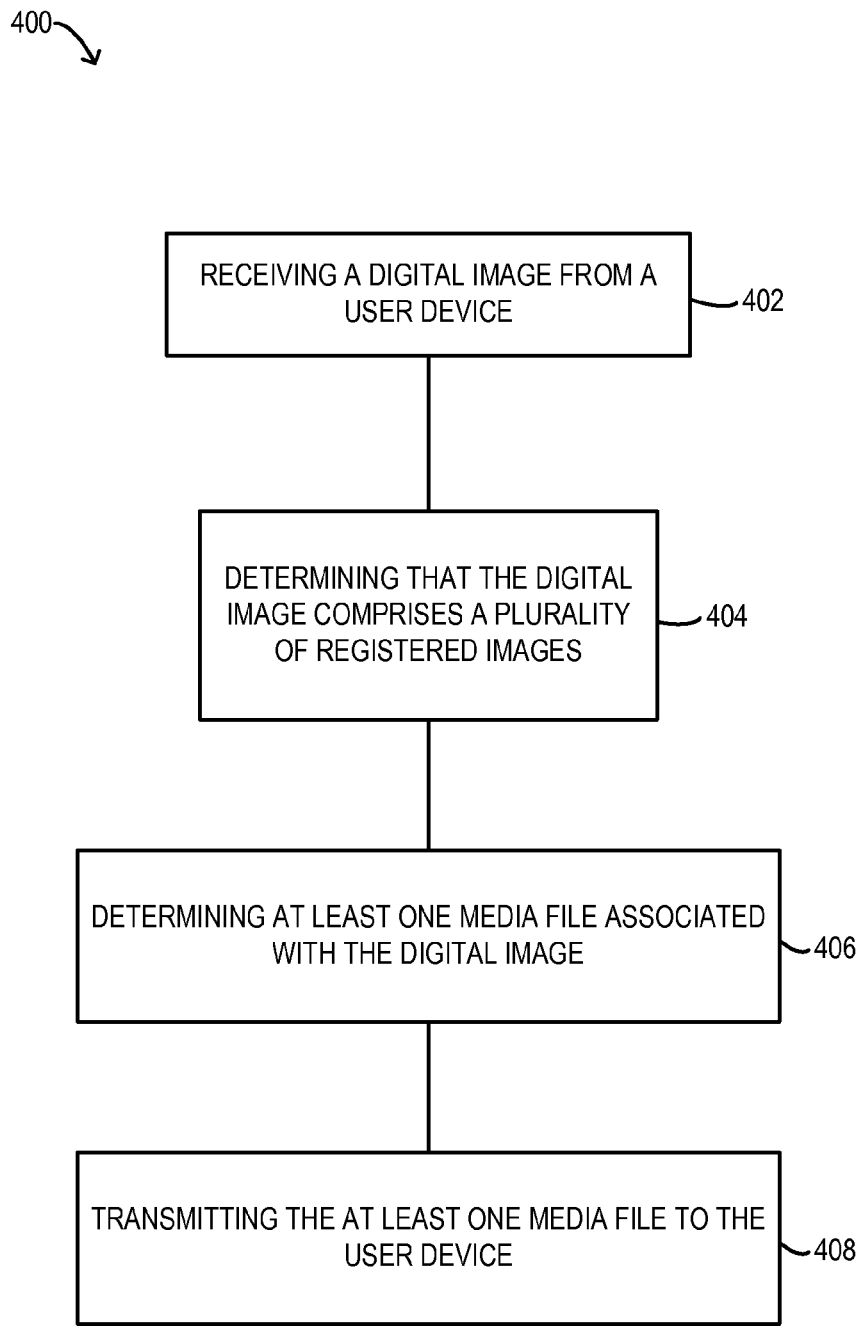
FIG. 4 is a flow diagram of a method according to some embodiments.

Turning to FIG. 4, a flow diagram of a method 400 according to some embodiments is shown. In some embodiments, the method 400 may be performed and/or implemented by and/or otherwise associated with one or more specialized and/or computerized processing devices, specialized computers, computer terminals, computer servers, computer systems and/or networks and/or any combinations thereof (e.g., user devices, network devices, the mobile device 104, the mobile device 204, the server 106, the media server 108 and/or the image/media association database 110). In some embodiments, the method 400 may be embodied in, facilitated by and/or otherwise associated with various input mechanisms and/or interfaces. In some embodiments, the components 402, 404, 406, 408 of the method 400 may be similar in configuration and/or functionality to similarly named and/or numbered components described in this disclosure.

The process and/or flow diagrams described in this disclosure do not necessarily imply a fixed order to any depicted actions, steps and/or procedures, and embodiments may generally be performed in any order that is practicable unless otherwise and specifically noted. Any of the processes and/or methods described in this disclosure may be performed and/or facilitated by hardware, software (including microcode), firmware, or any combination thereof. For example, a storage medium (e.g., a hard disk, Universal Serial Bus (USB) mass storage device and/or Digital Video Disk (DVD)) may store thereon instructions that when executed by a machine (such as a computerized processing device) result in performance of one or more actions, steps and/or procedures, according to any one or more of the embodiments described in this disclosure.

In some embodiments, the method 400 may be illustrative of a process implemented to facilitate the providing of at least one media file based on a received digital image. According to some embodiments, the method 400 may comprise receiving a digital image from a user device, at 402. The digital image may, for example, be received by a mobile device (e.g., mobile device 104) and/or central controller device (e.g., server 106) from one or more user devices, such as personal computers, laptop computers, mobile devices, wireless phones, tablet computers, digital cameras, set-top boxes, game consoles and/or other devices capable of and/or configured to generate and/or transmit digital image files via a communications network. As described in this disclosure, in some embodiments the digital image may be captured (e.g., using a camera application, using an image recognition application) by a mobile device comprising and/or in communication with an image capture device (e.g., camera, scanner). In some embodiments, the digital image may be received by a central server (e.g., from a mobile device that captured the digital image). In some embodiments, multiple images may be received, and in some embodiments the multiple images may be related as a group (e.g., as component images of a larger image).

According to some embodiments, the method 400 may comprise determining that the digital image comprises a plurality of registered images, at 404. In some embodiments, this may comprise recognizing, using image recognition technology, one or more of a plurality of images appearing in the digital image and/or recognizing one or more of a plurality of display devices displaying a respective image. In one example, a mobile device and/or central controller device may determine that a captured digital image comprises multiple pictures of individuals, such as paper-based and/or electronic player trading cards. In one example, a mobile device and/or central controller device may determine that a captured digital image comprises a particular arrangement of multiple images (e.g., the set of images 302 that complete an image of an automobile when arranged as depicted in FIG. 3) and/or display devices (e.g., two or more Pixit displays).

In some embodiments, the method 400 may comprise determining at least one media file associated with the digital image, at 406. In one embodiment, as discussed in this disclosure, an indication of an associated media file (e.g., a video) may be stored in a database in association with the plurality of images (e.g., a group identifier) and/or the composite digital image. In one example, a mobile device and/or central controller device identifies the at least one media file (e.g., by accessing image/media association database 110 based on the identification of the digital image and/or the plurality of component images).

In some embodiments, the method 400 may comprise transmitting the at least one media file to the user device, at 406. In some embodiments, transmitting may comprise retrieving a copy of the at least one media file (e.g., from media server 108) and transmitting the copy to the user device (e.g., mobile device 104 used to capture the digital image). In some embodiments, transmitting may comprise transmitting a signal to a media server to instruct and/or authorize the media server to allow a user device access to the at least one media file and/or transmit the at least one media file to the user device. In one example, the server 106 transmits a video associated with a digital image displayed to a user via a plurality of Pixit displays or other types of display devices, allowing the user's mobile device to output the video to the user, thereby providing the user with an enhanced media experience based on a collection of images.

Figure 5:
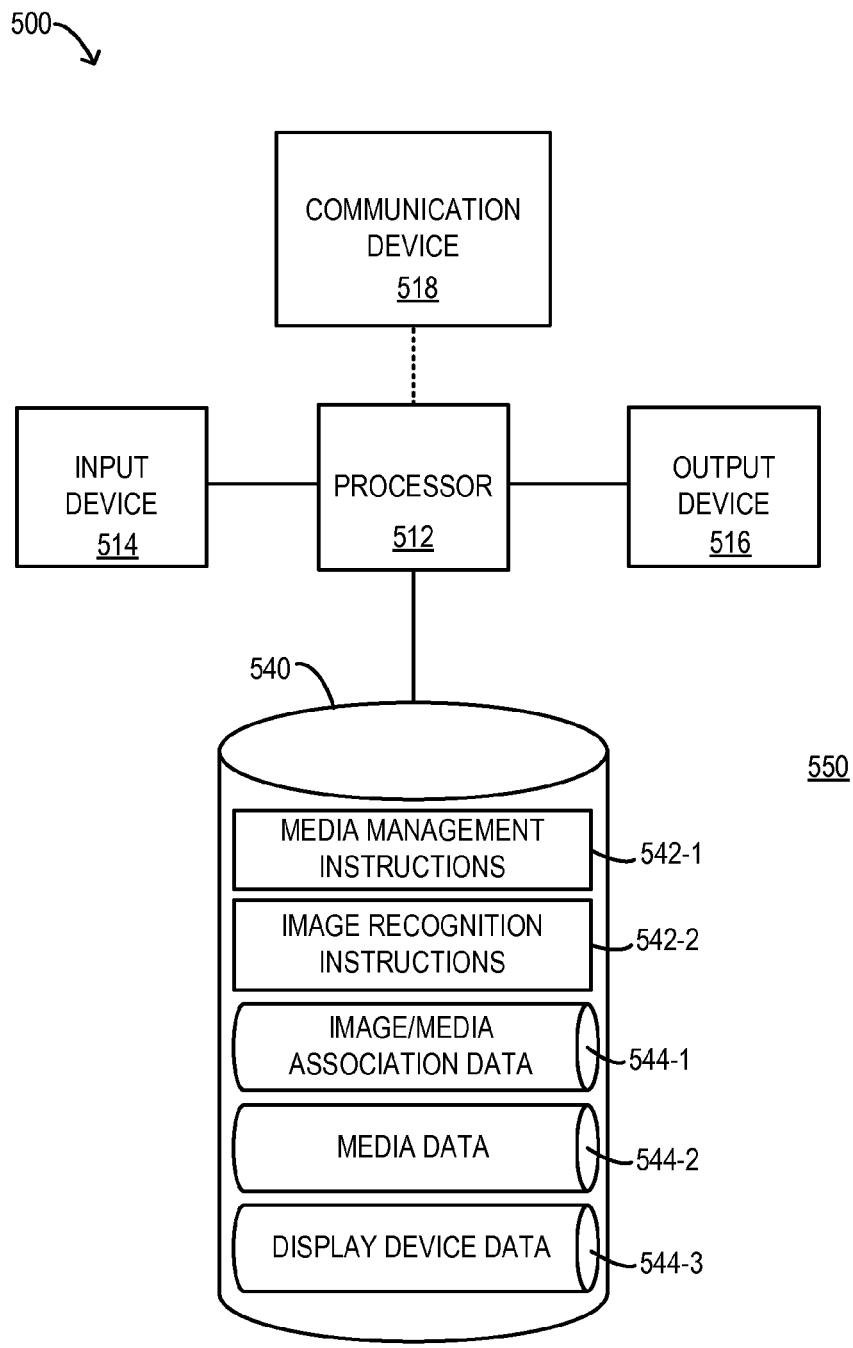
FIG. 5 is a block diagram of an apparatus according to some embodiments.

Turning to FIG. 5, a block diagram of an apparatus 500 according to some embodiments is shown. In some embodiments, the apparatus 500 may be similar in configuration and/or functionality to the described user devices, mobile device 104, the mobile device 204, the server 106, the media server 108 and/or the image/media association database 110 described in this disclosure. The apparatus 500 may, for example, execute, process, facilitate and/or otherwise be associated with the method 400 of FIG. 4 and/or may output or otherwise provide various interfaces. In some embodiments, the apparatus 500 may comprise an electronic processor 512, an input device 514, an output device 516, a communication device 518 and/or a memory device 540. Fewer or more components 512, 514, 516, 518, 540 and/or various configurations of the components 512, 514, 516, 518, 540 may be included in the apparatus 500 without deviating from the scope of embodiments described in this disclosure. In some embodiments, the components 512, 514, 516, 518, 540 of the apparatus 500 may be similar in configuration and/or functionality to similarly named and/or numbered components as described in this disclosure.

According to some embodiments, the electronic processor 512 may be or include any type, quantity and/or configuration of electronic and/or computerized processor that is or becomes known. The electronic processor 512 may comprise, for example, an Intel® DO 2800 network processor or an Intel® XEON™ Processor coupled with an Intel® E7501 chipset. In some embodiments, the electronic processor 512 may comprise multiple inter-connected processors, microprocessors and/or micro-engines. According to some embodiments, the electronic processor 512 (and/or the apparatus 500 and/or other components thereof) may be supplied power via a power supply (not shown) such as a battery, an Alternating Current (AC) source, a Direct Current (DC) source, an AC/DC adapter, solar cells and/or an inertial generator. In some embodiments, such as in the case that the apparatus 500 comprises a server such as a blade server, necessary power may be supplied via a standard AC outlet, power strip, surge protector and/or Uninterruptible Power Supply (UPS) device.

In some embodiments, the input device 514 and/or the output device 516 are communicatively coupled to the electronic processor 512 (e.g., via wired and/or wireless connections, traces and/or pathways) and they may generally comprise any types or configurations of input and output components and/or devices that are or become known, respectively. The input device 514 may comprise, for example, a keyboard that allows an operator of the apparatus 500 to interface with the apparatus 500 (e.g., a user of a mobile device, such as to implement and/or interact with embodiments described in this disclosure for capturing digital images and/or receiving additional media files). The output device 516 may, according to some embodiments, comprise a display screen and/or other practicable output component and/or device. The output device 516 may, for example, provide playback of any media files associated with captured digital images (e.g., videos, music). According to some embodiments, the input device 514 and/or the output device 516 may comprise and/or be embodied in a single device such as a touch-screen monitor.

In some embodiments, the communication device 518 may comprise any type or configuration of communication device that is or becomes known or practicable. The communication device 518 may, for example, comprise a Network Interface Card (NIC), a telephonic device, a cellular network device, a router, a hub, a modem and/or a communications port or cable. In some embodiments, the communication device 518 may be coupled to communicate with and/or instruct one or more central servers and/or media servers in accordance with embodiments described in this disclosure. According to some embodiments, the communication device 518 may also or alternatively be coupled to the electronic processor 512. In some embodiments, the communication device 518 may comprise an Infra-red Radiation (IR), Radio Frequency (RF), Bluetooth™, Near-Field Communication (NFC) and/or Wi-Fi® network device coupled to facilitate communications between the electronic processor 512 and one or more other devices (such as a mobile device, personal computer, server, etc.).

The memory device 540 may comprise any appropriate information storage device that is or becomes known or available, including, but not limited to, units and/or combinations of magnetic storage devices (e.g., a hard disk drive), optical storage devices and/or semiconductor memory devices such as Random Access Memory (RAM) devices, Read Only Memory (ROM) devices, Single Data Rate Random Access Memory (SDR-RAM), Double Data Rate Random Access Memory (DDR-RAM) and/or Programmable Read Only Memory (PROM).

The memory device 540 may, according to some embodiments, store one or more of media management instructions 542-1 and/or image recognition instructions 542-2. In some embodiments, the media management instructions 542-1 and/or image recognition instructions 542-2 may be utilized by the electronic processor 512 to provide output information via the output device 516 and/or the communication device 518 (e.g., the providing of a media file associated with a received digital image, to a user device at 408 of the method 400 of FIG. 4).

According to some embodiments, the media management instructions 542-1 may be operable to cause the electronic processor 512 to access image/media association data 544-1, media data 544-2 and/or display device data 544-3 (e.g., in accordance with the method 400 of FIG. 4 in this disclosure). Image/media association data 544-1, media data 544-2 and/or display device data 544-3 received via the input device 514 and/or the communication device 518 may, for example, be analyzed, sorted, filtered and/or otherwise processed by the electronic processor 512 in accordance with the media management instructions 542-1. In some embodiments, image/media association data 544-1, media data 544-2 and/or display device data 544-3 may be fed by the electronic processor 512 through one or more rule sets, policies and/or models in accordance with the media management instructions 542-1 to receive and/or register digital images and/or other types of media content (e.g., from a user device), transmit or otherwise make available registered digital images to one or more display devices (e.g., Pixit displays), associate one or more digital images with one or more additional media files, associate one or more digital images with one or more display devices, generate a plurality of component images of a larger image, determine at least one media file associated with a digital image (e.g., captured by a user's mobile device) and/or transmit other otherwise make available associated media files to one or more user devices, as described with respect to various embodiments in this disclosure.

According to some embodiments, the image recognition instructions 542-2 may be operable to cause the electronic processor 512 to access the image/media association data 544-1, media data 544-2 and/or display device data 544-3 (e.g., in accordance with the method 400 of FIG. 4 in this disclosure). Image/media association data 544-1, media data 544-2 and/or display device data 544-3 received via the input device 514 and/or the communication device 518 may, for example, be analyzed, sorted, filtered, decoded, decompressed, ranked, scored, plotted and/or otherwise processed by the electronic processor 512 in accordance with the image recognition instructions 542-2. In some embodiments, image/media association data 544-1, media data 544-2 and/or display device data 544-3 may be fed by the electronic processor 512 through one or more mathematical and/or statistical formulas, rule sets, policies and/or models in accordance with the image recognition instructions 542-2 to determine whether a received image matches or resembles at least one registered digital image, determine whether a received image is comprised of a plurality of registered digital images and/or determine whether a received image is comprised of at least one image displayed on at least one registered display device. (e.g., the receiving at 402 and/or determining at 404 of the method 400 of FIG. 4) and/or to send instructions to and/or otherwise cause a mobile device or other type of user device to determine information about digital images, as described in this disclosure.

In some embodiments, the image/media association data 544-1 may comprise data including, but not limited to, data descriptive of one or more media files (e.g., image files, video files, digital pictures, audio files and music files) and/or display devices. For example, image/media association data 544-1 may include information associating a digital image with an additional media file (e.g., that may be provided to a user in response to the user scanning the digital image) and/or associating the digital image with one or more display devices (e.g., registered Pixit displays). According to some embodiments, the media data 544-2 may comprise one or more media files (e.g., image files, video files, digital pictures, audio files and music files). In some embodiments, the display device data 544-3 may comprise data including, but not limited to, data descriptive of display devices and/or one or more users associated with display devices.

In some embodiments, the apparatus 500 may comprise a web server and/or other portal (e.g., an Interactive Voice Response Unit (IVRU)) that provides additional media content to users. According to some embodiments, the apparatus 500 may comprise and/or provide an interface via which users may upload, register, play back and/or otherwise manage media content, including digital images.

Any or all of the exemplary instructions and data types described in this disclosure and other practicable types of data may be stored in any number, type and/or configuration of memory devices that are or become known. The memory device 540 may, for example, comprise one or more data tables or files, databases, table spaces, registers and/or other storage structures. In some embodiments, multiple databases and/or storage structures (and/or multiple memory devices 540) may be utilized to store information associated with the apparatus 500. According to some embodiments, the memory device 540 may be incorporated into and/or otherwise coupled to the apparatus 500 (e.g., as shown) or may simply be accessible to the apparatus 500 (e.g., externally located and/or situated). In some embodiments, fewer or more data elements 544-1, 544-2, 544-3 and/or fewer or more types than those depicted may be necessary and/or desired to implement embodiments described in this disclosure.

As described in this disclosure, in accordance with some embodiments, data storage devices may be useful for storing various types of information. Data storage devices may, for example, be utilized to store instructions (e.g., computer software instructions) and/or data such as image/media association data 544-1, media data 544-2 and/or display device data 544-3, each of which is described in reference to FIG. 5 in this disclosure. In some embodiments, instructions stored on the data storage devices may, when executed by a processor (such as the electronic processor 512 of FIG. 5), cause the implementation of and/or facilitate the method 400 of FIG. 4 (and/or portions thereof).

According to some embodiments, a data storage device may comprise a CD, CD-ROM, DVD, Blu-Ray™ Disc and/or other type of optically-encoded disk and/or other computer-readable storage medium that is or becomes know or practicable. In some embodiments, a data storage device may comprise a USB keyfob, dongle and/or other type of flash memory data storage device that is or becomes known or practicable.

As will readily understood by those skilled in the art, data storage devices may generally store program instructions, code and/or modules that, when executed by an electronic and/or computerized processing device cause a particular machine to function in accordance with embodiments described in this disclosure. In some embodiments, data storage devices may be representative of a class and/or subset of computer-readable media that are defined in this disclosure as "computer-readable memory" (e.g., memory devices). While computer-readable media may include transitory media types, as utilized in this disclosure, the term computer-readable memory is limited to non-transitory computer-readable media.

Some embodiments described in this disclosure are associated with a "user device" or a "network device". As used in this disclosure, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used in this disclosure, a "user" may generally refer to any individual and/or entity that operates a user device. Users may comprise, for example, customers, consumers, product underwriters, product distributors, customer service representatives, agents, brokers, etc.

As used in this disclosure, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used in this disclosure, the terms "network" and "communication network" may be used interchangeably and may refer to any object, entity, component, device and/or any combination thereof that permits, facilitates and/or otherwise contributes to or is associated with the transmission of messages, packets, signals and/or other forms of information between and/or within one or more network devices. Networks may be or include a plurality of interconnected network devices. In some embodiments, networks may be hard-wired, wireless, virtual, neural and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used in this disclosure, the terms "information" and "data" may be used interchangeably and may refer to any data, text, voice, video, image, message, bit, packet, pulse, tone, waveform and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted and/or otherwise packaged or manipulated in accordance with any method that is or becomes known or practicable.

In addition, some embodiments described in this disclosure are associated with an "indication". As used in this disclosure, the term "indication" may be used to refer to any indicia and/or other information indicative of or associated with a subject, item, entity and/or other object and/or idea. As used in this disclosure, the phrases "information indicative of" and "indicia" may be used to refer to any information that represents, describes and/or is otherwise associated with a related entity, subject, or object. Indicia of information may include, for example, a code, a reference, a link, a signal, an identifier and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Figure 6:
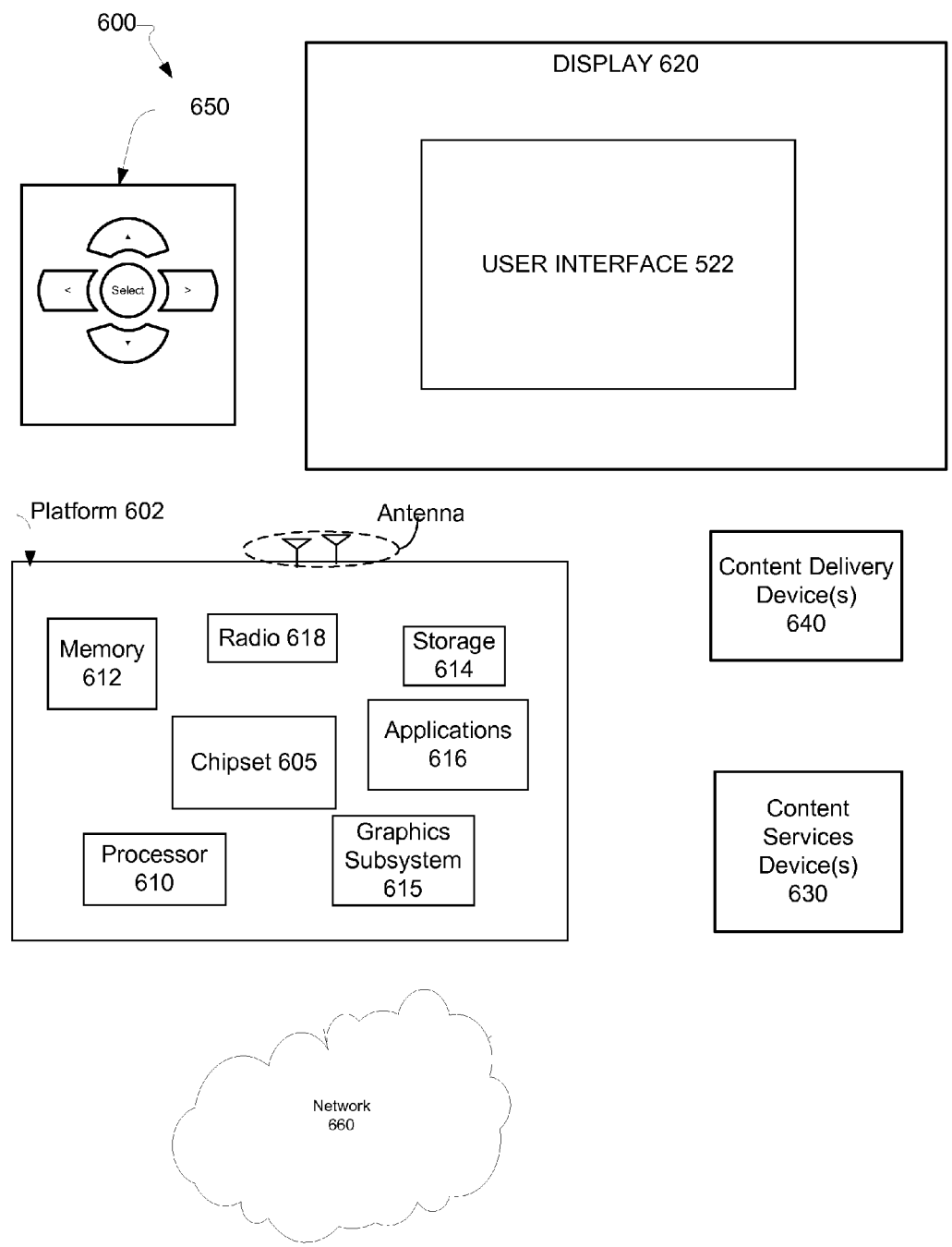
FIG. 6 illustrates another system in accordance with some embodiments.

FIG. 6 illustrates an embodiment of a system 600. In embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 600 comprises a platform 602 coupled to a display 620. Platform 602 may receive content from a content device such as content services device(s) 630 or content delivery device(s) 640 or other similar content sources. A navigation controller 660 comprising one or more navigation features may be used to interact with, for example, platform 602 and/or display 620. Each of these components is described in more detail below.

In embodiments, platform 602 may comprise any combination of a chipset 606, processor 610, memory 612, storage

614, graphics subsystem 616, applications 616 and/or radio 618. Chipset 606 may provide intercommunication among processor 610, memory 612, storage 614, graphics subsystem 616, applications 616 and/or radio 618. For example, chipset 606 may include a storage adapter (not depicted) capable of providing intercommunication with storage 614.

Processor 610 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 610 may comprise dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 614 may comprise technology to increase the storage performance enhanced protection for valuable digital media when multiple hard drives are included, for example.

Graphics subsystem 616 may perform processing of images such as still or video for display. Graphics subsystem 616 may be a graphics processing unit (GPU) or a visual processing unit (VPU), for example. An analog or digital interface may be used to communicatively couple graphics subsystem 616 and display 620. For example, the interface may be any of a High-Definition Multimedia Interface, DisplayPort, wireless HDMI, and/or wireless HD compliant techniques. Graphics subsystem 616 could be integrated into processor 610 or chipset 606. Graphics subsystem 616 could be a stand-alone card communicatively coupled to chipset 606.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, display 620 may comprise any television type monitor or display. Display 620 may comprise, for example, a computer display screen, touch screen display, video monitor, television-like device, and/or a television. Display 620 may be digital and/or analog. In embodiments, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In embodiments, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 receives content such as cable television programming including media information, digital information, and/or other content. Examples of content providers may include any cable or satellite television or radio or Internet content providers. The provided examples are not meant to limit embodiments of the invention.

In embodiments, platform 602 may receive control signals from navigation controller 660 having one or more navigation features. The navigation features of controller 660 may be used to interact with user interface 622, for example. In embodiments, navigation controller 660 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 660 may be echoed on a display (e.g., display 620) by movements of a pointer, cursor, focus ring, or other visual indicators displayed on the display. For example, under the control of software applications 616, the navigation features located on navigation controller 660 may be mapped to virtual navigation features displayed on user interface 622, for example. In embodiments, controller 660 may not be a separate component but integrated into platform 602 and/or display 620. Embodiments, however, are not limited to the elements or in the context shown or described herein.

In embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off" In addition, chip set 606 may comprise hardware and/or software support for 6.1 surround sound audio and/or high definition 6.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
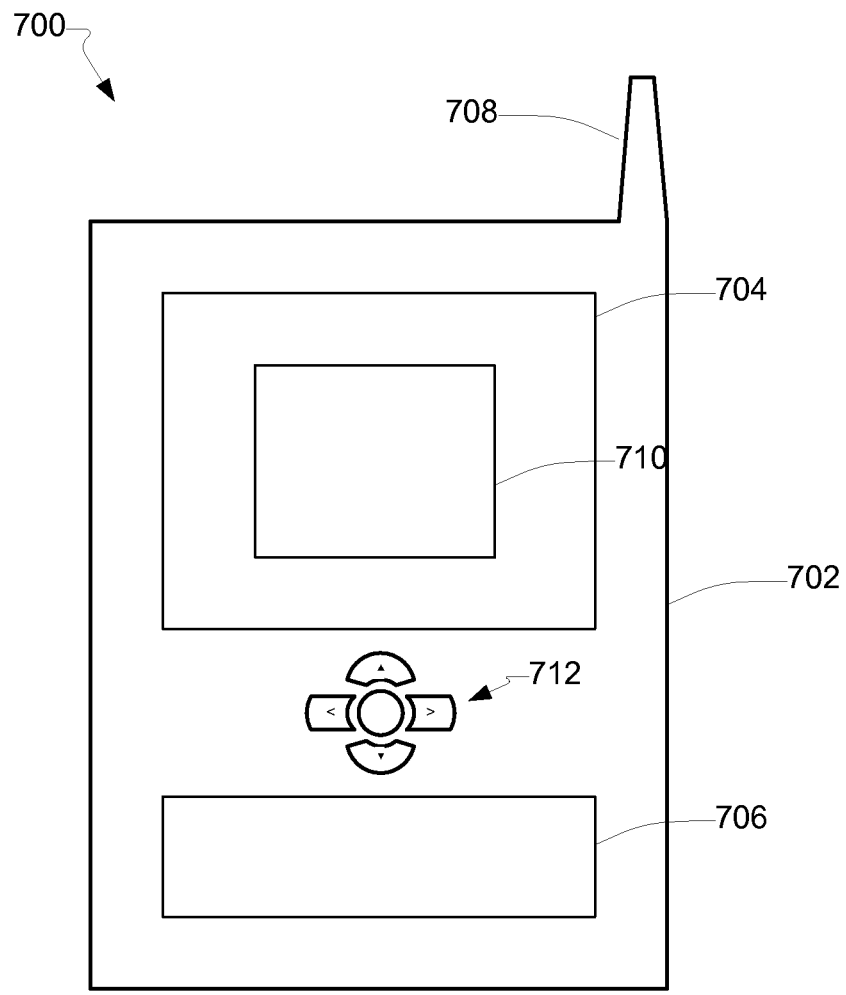
FIG. 7 is an example of a small form factor device in accordance with some embodiments.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various modifications and changes may be made to the foregoing embodiments without departing from the broader spirit and scope set forth in the appended claims. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

What is claimed is:

1. A method, comprising:
receiving, by a central controller device and from a mobile device, a digital image captured using the mobile device;
determining, by the central controller device and based on the digital image, that the digital image is a composite image formed from a plurality of images registered in a database;
determining, by the central controller device and in response to determining that the composite digital image is formed from a plurality of images registered in a database, at least one media file associated with the composite digital image; and
transmitting, by the central controller device to the mobile device, the at least one media file.

2. The method of claim 1, further comprising:
determining that the composite digital image comprises the plurality of images arranged in a predetermined arrangement.

3. The method of claim 1,
wherein each of the plurality of images is a piece of a larger picture, and further comprising:
recognizing that the composite digital image formed from the plurality of images comprises a representation of the larger picture.

4. The method of claim 1, wherein the plurality of images comprises respective pictures of individuals.

5. The method of claim 1, wherein the plurality of images is registered in the database as a group.

6. The method of claim 1, wherein determining the at least one media file comprises accessing an image/media association database to determine an identifier, associated with the composite digital image, that identifies the at least one media file.

7. The method of claim 1, wherein transmitting the at least one media file comprises initiating transmission of the at least one media file from a media server to the mobile device.

8. The method of claim 1, wherein the at least one media file comprises one or more of: a video file, an audio file, an advertisement, a text message, and an e-mail message.

9. The method of claim 1, further comprising:
receiving, by the central controller device from a user device, the plurality of images;
registering, by the central controller device, each of the plurality of images in the database;
receiving, by the central controller device from the user device, an indication of a first media file;
associating, by the central controller device, the first media file with a first image of the plurality of images; and
transmitting, by the central controller device to a display device, the first image.

10. The method of claim 9, wherein the display device comprises one or more of: a low power display device, an e-ink display device, a table computer, a laptop computer and a mobile device.

11. A non-transitory computer-readable medium storing specially-programmed instructions that when executed by a computing device, result in:
receiving, by a central controller device and from a mobile device, a digital image captured using the mobile device;
determining, by the central controller device and based on the digital image, that the digital image is a composite image formed from a plurality of images registered in a database;
determining, by the central controller device and in response to determining that the composite digital image is formed from a plurality of images registered in a database, at least one media file associated with the digital image; and
transmitting, by the central controller device to the mobile device, the at least one media file.

12. The non-transitory computer-readable medium of claim 11, wherein the specially-programmed instructions, when executed by the computing device, further result in:
determining that the composite digital image comprises the plurality of images arranged in a predetermined arrangement.

13. The non-transitory computer-readable medium of claim 11,
wherein each of the plurality of images is a piece of a larger picture, and
wherein the specially-programmed instructions, when executed by the computing device, further result in:
recognizing that the composite digital image formed from the plurality of images comprises a representation of the larger picture.

14. The non-transitory computer-readable medium of claim 11, wherein the at least one media file comprises one or more of: a video file, an audio file, an advertisement, a text message, and an e-mail message.

15. The non-transitory computer-readable medium of claim 11, further comprising:
receiving, by the central controller device from a user device, the plurality of images;
registering, by the central controller device, each of the plurality of images in the database;
receiving, by the central controller device from the user device, an indication of a first media file;
associating, by the central controller device, the first media file with a first image of the plurality of images; and
transmitting, by the central controller device to a display device, the first image.

16. An apparatus, comprising:
a computerized processing device;
an operating system; and
a memory device in communication with the computerized processing device and storing specially-programmed instructions that when executed by the computerized processing device in accordance with the operating system result in:
receiving a digital image captured using a mobile device;
determining, based on the digital image, that the digital image is a composite image formed from a plurality of images registered in a database;
determining, in response to determining that the composite digital image is formed from a plurality of images registered in a database, at least one media file associated with the digital image; and
transmitting, to the mobile device, the at least one media file.

17. The apparatus of claim 16, wherein the specially-programmed instructions, when executed by the computerized processing device, further result in:
determining that the composite digital image comprises the plurality of images arranged in a predetermined arrangement.

18. The apparatus of claim 16,
wherein each of the plurality of images is a piece of a larger picture, and
wherein the specially-programmed instructions, when executed by the computerized processing device, further result in:
recognizing that the composite digital image formed from the plurality of images comprises a representation of the larger picture.

19. The apparatus of claim 18, wherein the at least one media file comprises one or more of: a video file, an audio file, an advertisement, a text message, and an e-mail message.

20. The apparatus of claim 16, wherein the specially-programmed instructions, when executed by the computerized processing device, further result in:
receiving, from a user device, the plurality of images;
registering each of the plurality of images in the database;
receiving, from the user device, an indication of a first media file;
associating the first media file with a first image of the plurality of images; and
transmitting, to a display device, the first image.

\* \* \* \* \*